United States Patent
Gaheen, Jr.

[15] 3,670,334
[45] June 13, 1972

[54] ATTITUDE CONTROL SYSTEM
[72] Inventor: Alfred F. Gaheen, Jr., Glen Burnie, Md.
[73] Assignee: Westinghouse Electric Corporation, Pittsburgh, Pa.
[22] Filed: March 24, 1969
[21] Appl. No.: 809,779

[52] U.S. Cl. ............... 343/7.4, 343/7 ED, 343/7.3, 343/9
[51] Int. Cl. .......................... G01s 9/02, G01s 9/44
[58] Field of Search ............... 343/7 ED, 7.3, 7.4, 9

[56] References Cited

UNITED STATES PATENTS 3,184,736  5/1965  Badewitz .................. 343/7 ED
3,362,024  1/1968  Badewitz .................. 343/7 ED Primary Examiner—T. H. Tubbesing
Attorney—F. H. Henson and E. P. Klipfel

[57] ABSTRACT

A radar system for use on an aircraft or spacecraft for determining and controlling the attitude of the system antenna or of the craft, the system including an antenna unit producing four equiangularly spaced beams each of which is angularly offset by a substantial amount from a center reference axis, and means for applying radar pulse signals to each beam in succession and for deriving, from the received pulses returning from the ground, range and velocity information which is employed for orienting the antenna unit or the craft on which the system is mounted so as to impart a vertical orientation to the antenna system reference axis.

2 Claims, 2 Drawing Figures

INVENTOR
Alfred F. Gaheen, Jr.

ATTITUDE CONTROL SYSTEM

BACKGROUND OF THE INVENTION

The present invention relates to a radar system, and particularly to a system for determining and controlling the attitude of the system antenna unit.

In the aircraft and spacecraft field, extensive use is made of radar for the detection and identification of other craft and the identification of underlying terrain. It has also been attempted to employ airborne or spaceborne radar systems to provide other information necessary for the proper operation of the craft, such information including the altitude, velocity and attitude of the craft relative to the ground. However, in order for a radar system to provide accurate information regarding these parameters, it is necessary that the antenna unit of such a system have an accurately determined attitude with respect to the ground because variations in the attitude of this unit will introduce errors into the velocity and altitude indications provided by the system.

Various techniques have already been proposed for determining and controlling the attitude of such a unit. One such proposal involves the use of the monopulse technique. This technique utilizes two closely spaced beams whose areas of coverage partially overlap one another. The bisector of the angle formed by the axes of the two beams is known as the antenna boresight and the antenna unit is arranged to be oriented so as to cause this boresight to lie in a plane which is perpendicular both to the ground being struck by the two beams and to the plane defined by the beam axes. This is accomplished by transmitting equal-amplitude pulses along the two beams, determining the amplitudes of the received ground return pulses associated with the two beams, and orienting the antenna unit until the amplitudes of the received pulses associated with the two beams are equal.

While this system functions well when the craft on which it is mounted is over level, substantially homogeneous terrain, its accuracy is adversely affected, sometimes by a substantial amount, when other types of terrain are encountered. For example, when the craft is situated so that one beam strikes a water body while the other beam strikes a land mass, the difference in radar signal reflectivity between the two surfaces being struck by the beams will result in an erroneous orientation of the antenna system boresight. Similarly, when the craft is over hilly or mountainous terrain, the inclination of the terrain will result in an inaccurate orientation of the antenna boresight.

Moreover, since both antenna beams will be substantially perpendicular to the ground when the antenna system is properly oriented, this antenna system could not itself be employed to provide useful information regarding the horizontal velocity of the craft.

SUMMARY OF THE INVENTION

It is a primary object of the present invention to overcome these drawbacks and difficulties.

Another object of the invention is to permit an airborne or spaceborne radar system to provide highly accurate attitude information.

Still another object of the invention is to provide an attitude-sensing system which is not sensitive to the nature of the terrain encountered.

Still another object of the invention is to provide an attitude-sensing system which simultaneously presents altitude and relative velocity information.

Yet a further object of the invention is to provide a radar system which acts to automatically maintain its antenna unit in the desired orientation.

These and other objects according to the invention are achieved by the provision of a novel pulse radar attitude-sensing system for use in an aircraft or spacecraft. This system essentially includes antenna means for radiating radar pulse signals toward the ground and receiving their reflections along two pairs of beams, radar pulse-generating means for generating a train of radar pulses and connected to the antenna means, and signal-processing means connected to the antenna means and pulse-generating means. The antenna means according to the invention are constructed so that the beams of each pair are angularly offset from one another to define a large acute angle and so that the center axes of one beam pair define a plane which intersects the plane defined by the center axes of the other beam pair along a line constituting the reference axis of the system. The radar pulse-generating means are connected to the antenna means for causing each pulse to be radiated along only one beam thereof and for periodically shifting the transmission of such pulses from one beam to another. Finally, the signal-processing means are arranged for receiving information relating to the transmission of radar pulses and the reception of their reflection along at least one beam pair and for producing, on the basis of such information, an output representing the difference between the measured distances to the ground along each beam of the pair, this difference being an indication of the inclination to the vertical of the reference axis of the system along the plane defined by the center axes of the beam pair.

DESCRIPTION OF THE PREFERRED EMBODIMENTS

Figure 1:
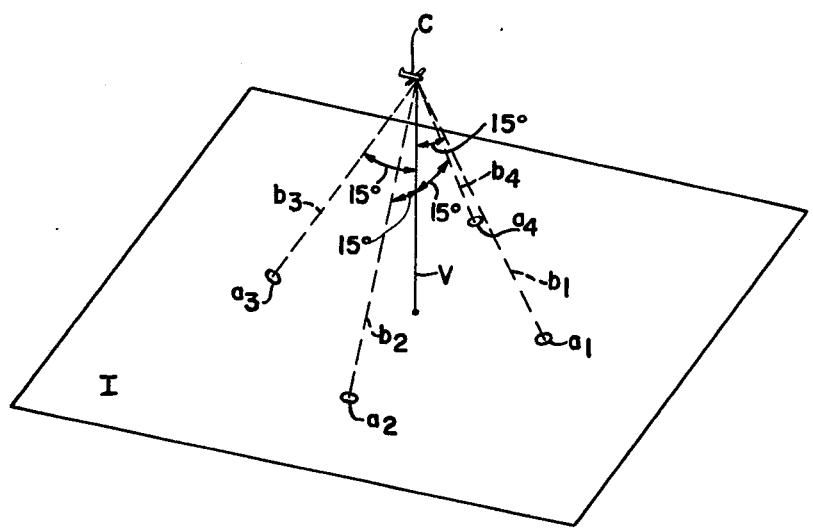
FIG. 1 is a perspective, pictorial view illustrating the basic principles of the present invention.

The basis of the attitude-sensing and correction technique of the present invention is illustrated in FIG. 1 which is a pictorial view showing an aircraft C flying over terrain T. This terrain may have any characteristics, i.e. it may be hilly, mountainous, partly dry land and partly water, but for the sake of simplicity it is here shown as being flat.

The aircraft is equipped with an attitude-sensing system according to the invention and this system includes an antenna unit which is constructed to produce four discrete radar beams whose axes are represented by the broken lines $b_1$, $b_2$, $b_3$ and $b_4$. Each beam is preferably made relatively narrow, i.e. to have the form of a pencil beam, and each beam strikes a small ground area, these areas being indicated as $a_1$, $a_2$, $a_3$ and $a_4$, respectively.

The attitude-sensing system carried by the craft further includes radar signal-generating means connected to the antenna system for causing each of the antenna beams to emit a signal whose return permits the range from the craft to the ground along the axis of the beam to be determined. This could be accomplished in a straightforward manner by applying a pulse signal to each beam and measuring the time required for the transmitted beam to strike the ground and return to the craft. To prevent confusion between the range signals associated with the various beams, a signal is applied to only one beam at a time and the period between the application of a radar signal to one beam and the application of a radar signal to the next succeeding beam is selected to permit unambiguous reception at the maximum range which the system is to encounter.

The four beams $b_1$, $b_2$, $b_3$ and $b_4$ are composed of two pairs, one pair of beams, $b_1$ and $b_3$, defining a plane which contains one axis of the craft, and the other pair of beams, $b_2$ and $b_4$, defining a plane which intersects the first-mentioned plane and which lies along a different axis of the craft. For example, these two planes are generally perpendicular to one another and the plane defined by the first pair of beams extends along the longitudinal axis, or roll axis, of the craft, while the plane defined by the second pair of beams lies along the pitch axis of the craft.

The line defined by the intersection of these two planes constitutes the reference axis of the antenna system and is indicated at $v$. The purpose of the attitude-sensing system according to the invention is to maintain a vertical orientation for this line, thus maintaining the antenna unit in a given orientation, or to determine the amount and direction of the inclination of this line with respect to the vertical, and thus to provide an indication of the actual attitude of the antenna unit.

In accordance with the present invention, the orientation of the reference line along the longitudinal axis of the craft is first determined by measuring the difference between the ranges indicated by the radar signals associated with beams $b_1$ and $b_3$. After the range from the craft to ground along each of the axis $b_1$ and $b_3$ has been detected by the attitude-sensing system, the system locks onto these two range indications and then commences to also apply signals to the beams $b_2$ and $b_4$ in alternation with the signals applied to beams $b_1$ and $b_3$. The range indications provided by beams $b_2$ and $b_4$ are similarly compared to provide an indication of the inclination of the antenna unit reference axis in a direction transverse to the craft.

If the antenna unit itself is to be maintained in the desired orientation, the signal-processing circuitry of the attitude-sensing system is arranged to provide error signals representing the difference between the ranges measured along beams $b_1$ and $b_3$ and the difference between the ranges measured along beams $b_2$ and $b_4$. The antenna unit is mounted on a platform which is capable of undergoing pivotal movement and the derived error signals are applied to suitable orienting motors for moving the platform into a position in which the reference axis of the antenna unit is vertical. Alternatively, the antenna unit could be rigidly connected to the craft and the error signals could be applied to automatically correct the attitude of the craft itself. Finally, the error signals could simply be displayed to provide information for correcting the attitude of the craft or the antenna unit.

As is shown in FIG. 1, the antenna unit is constructed so that the individual beams are widely spaced angularly from one another, each beam being inclined at an angle of 15° with respect to the reference axis $v$ in preferred embodiments of the invention. The large angle thus existing between each pair of beams is highly advantageous because it causes the range differential between the two beams to have a substantial value when the reference axis of the antenna system is inclined, even by a relatively small amount, with respect to the vertical. On the other hand, it is desired that this angle not be too large, because the greater the inclination of the beams, the greater the required average signal power.

One consideration governing the minimum inclination angle of the beams is the maximum initial inclination which the reference axis $v$ could have at the start of one attitude correcting operation. The inclination of the beams is preferably made sufficiently great to enable each beam to be inclined in its intended direction with respect to vertical even when such a maximum inclination exists. For example, beam $b_1$ should always be pointing ahead of the craft because if the inclination of axis $v$ can become so great that the beam $b_1$ could point toward the rear of the craft, the difference between the ranges indicated by beams $b_1$ and $b_3$ would present an ambiguity with regard to the inclination which they indicate.

The width of each beam determines essentially the area $a$ of the ground which will be covered by the beam. In embodiments of the invention, this width is in no way critical and can vary over a wide range. However, it is desired that the width not be too great since this would increase the power which must be delivered to the beam to provide a return signal of a particular amplitude and will reduce the accuracy of the resulting range indication. On the other hand, it is desired that the width not be too small because this would present certain antenna design problems and would render the system too sensitive to small terrain irregularities. Thus, if the area $a$ is sufficiently large, isolated hills or valleys will not introduce any substantial error into the range indication. In practice, a beam subtending an angle of the order of 4° has been found to be highly suitable.

The attitude-sensing system according to the invention is highly advantageous because the accuracy of its attitude indications are in no way adversely affected in those situations where one or several of the beams are directed toward water bodies and the other beams are directed toward land masses. This is true because the range indication produced by the system is not dependent on the reflection characteristics of the various surfaces.

Moreover, only very small inaccuracies are introduced into the attitude-determination when one or several of the beams encounters hilly or mountainous terrain because the range indication variation which the presence of such terrain will produce will be quite small, particularly when the system is employed in high-altitude aircraft or spacecraft. In this connection it should be noted that, in such applications, errors due to the height of mountainous or hilly terrain are substantially smaller than are the errors produced in monopulse systems by the inclination of such terrain.

In further accordance with the invention, the attitude-sensing system employs range signals of a type which also provides velocity information, thus permitting both the altitude and the velocity of the craft, with respect to two axes, to be determined. In order to assure the presentation of accurate information, it is preferred that the velocity indication only be provided after the range information has been employed to bring the antenna unit to its desired orientation.

Figure 2:
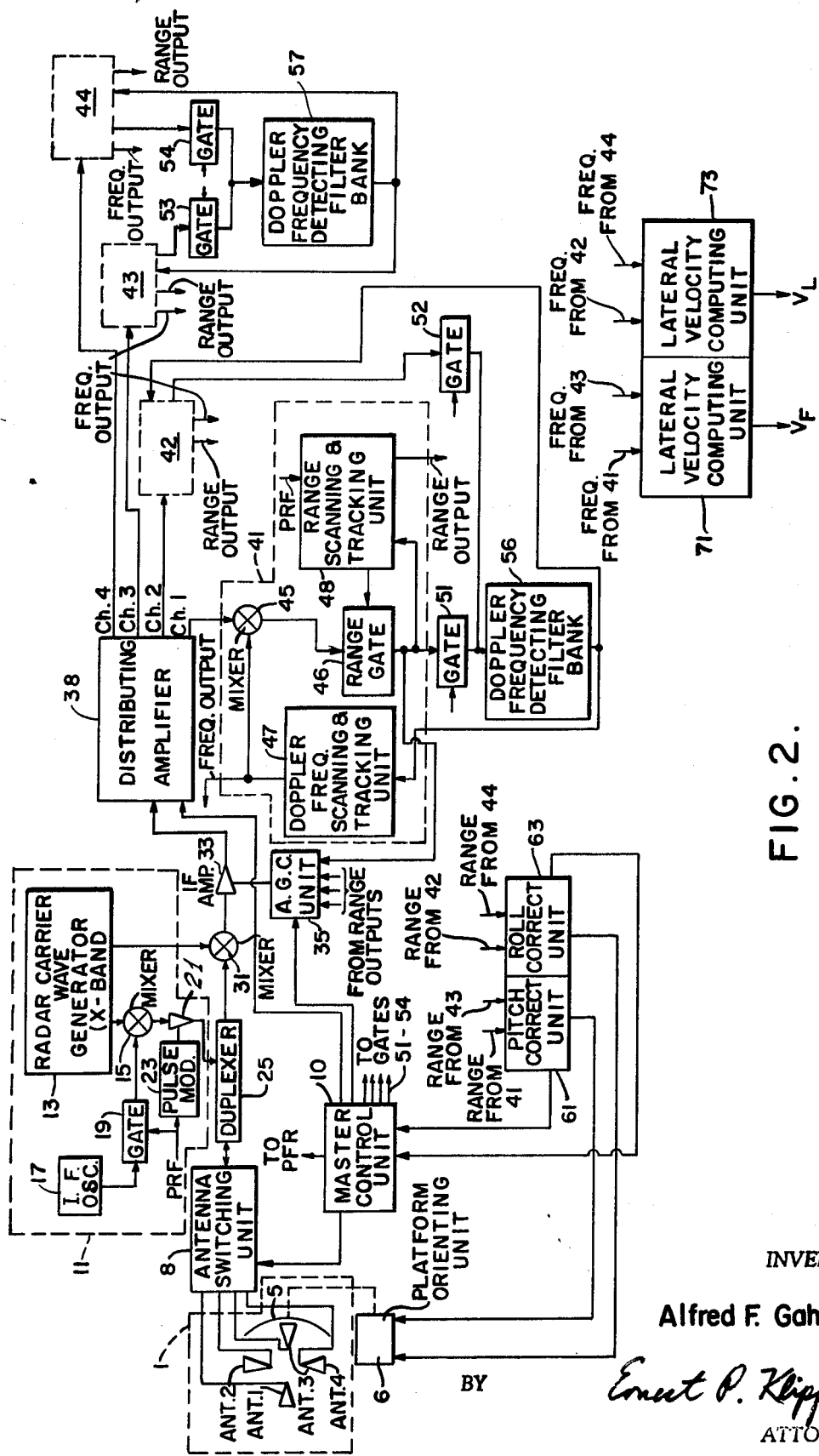
FIG. 2 is a block diagram of a radar circuit forming a part of a preferred embodiment of the present invention.

FIG. 2 is a circuit diagram of one radar signal processing circuit for use in an attitude-sensing system according to the invention. The circuit shown is chosen only for exemplary purposes. It should be understood that many other arrangements of known units could be employed to attain the objectives of the present invention.

The circuit illustrated in FIG. 2 is composed firstly of an antenna unit 1 composed of a gimballed support 5 and antenna elements ANT 1, ANT 2, ANT 3 and ANT 4, each of these elements producing a respective one of the beams $b_1$ to $b_4$ illustrated in FIG. 1. Each antenna element could be constituted by one of four offset feeds associated with a single paraboloidal dish. Such dish would form a part of the support 5. Alternatively, the antenna unit 1 could be composed of a Cassegrain reflector having four offset feeds, or by an all-electronic-scanned phased array or by an electronic lobe-switched phase array. Many other types of antenna arrangement could be employed, the present invention being primarily concerned with the general relationship between the antenna beams rather than the specifics of the antenna structure. In any event, it is preferable that the antenna be of the type in which all four beams share a common aperture.

The support element 5 is mounted on the craft and connected to have its orientation controlled by a platform-orienting unit 6. The four antenna elements are electrically connected to an antenna-switching unit 8 which controls the connection of each antenna element to the remainder of the circuit. The operation of the antenna-switching unit is controlled by a master control unit 10 in a manner to be described in detail below.

The signals which are to be radiated by the antenna elements along the four beams are produced in the transmitter and modulator unit 11. This unit includes a radar carrier wave generator 13 producing a continuous coherent X-band signal. This signal is sent to a mixer 15 which also receives an I.F. signal delivered from an oscillator 17 via a gate 19. The output from the mixer 15, whose frequency is equal to the difference between the frequencies of the signals produced by the generator 13 and the oscillator 17, is delivered to an amplifier 21 whose output is controlled by modulation pulses delivered by a pulse modulator 23 connected to the amplifier 21.

The operation of gate 19 and pulse modulator 23 are controlled by radar signal control pulses occurring at the system pulse repetition frequency (PRF), these pulses being delivered by the master control unit 10. Each such pulse from the master control unit opens gate 19 and activates pulse modulator 23 so that at the output of amplifier 21 there will appear a pulse constituted by a signal burst whose frequency is equal to the difference between the output frequency of the carrier wave generator and the output frequency of the I.F. oscillator.

These signal pulses are delivered to a duplexer 25 which is connected to convey pulses from the amplifier 21 to the antenna elements of unit 1, each pulse being delivered to a selected antenna element under the control of switching unit 8. The duplexer 25 has another output connected to one input of a further mixer 31 for conducting thereto the ground return pulse signals received by the antenna elements. Mixer 31 is also connected to carrier wave generator 13 for receiving the X-band frequency of that generator.

The output signal from mixer 31 will have a frequency equal to the difference between the frequencies of the signals applied to its two inputs. Thus, during the period when a received echo pulse signal is being delivered to mixer 31, the mixer output signal will be at a frequency equal to the I.F. frequency (X-Band and frequency minus transmitted frequency) PLUS A Doppler shift frequency proportional to the velocity of the craft in the direction of the axis of the radar beam relative to the ground area struck by the beam.

The output from mixer 31 is delivered to the input of an I.F. amplifier 33 gain is controlled by plus a unit 35. The passband of the I.F. amplifier 33 is centered on the frequency of the output of I.F. oscillator 17 so that this amplifier will only be responsive to the output from mixer 31 when a reflected pulse signal is being received. The A.G.C. unit 35 is simply provided to cause the amplifier 33 to produce output pulses of uniform amplitude in response to the received reflected signals associated with all four beams. This signal amplitude uniformity assures that the elements provided for processing the signals associated with the four beams will receive comparable signals.

The output from I.F. amplifier 33 is delivered to a distributing amplifier 38 having four output channels, Ch. 1, Ch. 2, Ch. 3 and Ch. 4. Distributing amplifier 38 is provided with a control input connected to master control unit 10 for receiving control signals that determine which output channel will receive each pulse delivered by amplifier 33. The control of distributing amplifier 38 is synchronized with that of antenna-switching unit 8 in such a manner that the reflected pulse signals received by each antenna element will be directed to one corresponding output channel, the reference numeral of each such channel corresponding to the reference numeral of its associated antenna element.

Each distributing amplifier output channel is connected to a respective one of four identical signal-extraction circuits 41, 42, 43 and 44. Only the circuit 41 is shown in detail, each of the other information-extraction circuits being identically constructed.

Circuit 41 includes a mixer 45 having one input connected to distributing amplifier output channel Ch. 1 and its other input connected to the output of a Doppler frequency scanning and tracking unit 47. The output from mixer 45 is connected to the input of a range gate 46 which is provided to determine the length of the time interval between the transmission of a signal pulse by elements ANT. 1 and the reception thereby of the returning reflection pulse, this time interval being proportional to the distance, or range, between the craft and the ground area $a_1$. The opening of range gate 46 is controlled by a range scanning and tracking unit 48 which is connected to receive the output from range gate 46 and which hence forms a feedback loop for the range gate.

Unit 48 is also connected to receive the radar control pulse signals produced at the pulse repetition frequency by master control unit 10 and functions, in a manner to be described in greater detail below, to bring the opening of range gate 46 into time coincidence with the appearance of a received signal pulse at output Ch. 1 of amplifier 38. Once such a coincidence has been achieved, unit 48 produces a range signal at its Range Output representing the time interval between the transmission of a pulse by element ANT. 1 and its reception of the return pulse. The output from range gate 46 is connected to a corresponding input of the A.G.C. unit 35 to adjust the amplification imparted by amplifier 33 to the return signals from antenna element ANT. 1.

The output of range gate 46 is also conveyed to a further gate 51 which is connected to be opened by a control signal from master control unit 10, such opening being effected during each interval when signals associated with amplifier output Ch. 1 are being processed. During this interval, any signals appearing at the output of range gate 46 are transmitted via gate 51 to a Doppler frequency-detecting filter bank 56 which detects the frequency of the carrier wave of the received pulse. The output from filter bank 56 is conducted to the Doppler frequency scanning and tracking unit 47 which, in response to output signals therefrom, applies to mixer 45 a signal whose frequency bears a predetermined relation with the frequency of the I.F. oscillation appearing at output Ch. 1 of amplifier 38. When this relationship is established, the output from mixer 45 will be at a predetermined frequency and the output from unit 47 will have a frequency proportional to the Doppler shift frequency of the return signal received by element ANT. 1. Since the value of this frequency will be proportional to both the velocity of the craft relative to the ground area struck by the radar signal in the direction of the associated beam and to the orientation of the antenna platform, this frequency will constitute an accurate indication of one component of the craft velocity only when the antenna platform is properly oriented wit its reference axis $v$ (FIG. 1) extending vertically. Therefore, master control unit 10 is preferably arranged to open gate 51 only after the platform has been so oriented. However, the system could also be arranged so that the frequency unit begins tracking before the range unit to assure proper acquisition by the frequency unit.

Each of the other information extraction units 42, 43 and 44 produces a corresponding range output and frequency output and is associated with a corresponding gate 52, 53, or 54. Since radar pulses are transmitted by each of the antenna elements in sequence, and the received return signal associated with each antenna element is delivered to a corresponding information extraction unit before a radar pulse signal is applied to the next succeeding antenna element, only one information extraction circuit receives a signal during any given radar pulse repetition interval so that it is possible for two information extraction units to share a common Doppler frequency-detecting filter bank. Thus, in the illustrated embodiment, information extraction unit 42 shares filter bank 56 with unit 41, while units 43 and 44 share a similar filter bank 57.

The range output signals from units 41 and 43, which indicate the ranges along beams $b_1$ and $b_3$, respectively, are delivered to a pitch correction unit 61, while the range output signals from units 42 and 44, corresponding to the ranges along beams $b_2$ and $b_4$, are delivered to a roll correction unit 63. The outputs from these correction units are delivered to platform-orienting unit 6 which pivots the platform 5 in order to give it the desired orientation. The output from pitch correction unit 61 controls the pivoting of platform 5 in a direction perpendicular to the craft pitch axis in such a manner as to cause the range outputs from units 41 and 43 to approach equality. Similarly, the output from roll correction unit 63 causes the platform 5 to be pivoted in a direction perpendicular to the craft roll axis in such a manner as to create equality between the range outputs from units 42 and 44.

If desired, the platform-orienting unit may be constructed to provide an indication of the orientation of the platform 5 relative to the craft to provide information as to the actual craft orientation once the antenna has been oriented.

After the antenna platform 5 has been oriented to have the proper pitch, a signal is sent by pitch correction unit 61 to master control unit 10 and after the platform has been given the desired roll orientation, a comparable signal is delivered by roll correction unit 63 to master control unit 10. Upon receipt of these signals, unit 10 acts to subsequently open gates 51 to 54 at the appropriate times to permit the production of frequency output signals representing the Doppler frequency content of each received return pulse.

The frequency output signals from units 41 and 43 are delivered to a forward velocity-computing unit 71, while the corresponding outputs from units 42 and 44 are delivered to a lateral velocity computing unit 73. These velocity computing units function in a known manner to convert the Doppler frequency information associated with the received return signals into indications of the forward velocity component $V_F$ of the craft in the plane defined by beams $b_1$ and $b_3$ and the lateral velocity component $V_L$ of the craft along the plane defined by beams $b_2$ and $b_4$.

All of the units illustrated in FIG. 2 are well known and could easily be fabricated by workers skilled in the art. Moreover, there are many other circuit arrangements which could be devised by those skilled in the art to derive the desired information from radar pulse signals of the type described.

In the illustrated circuit, the master control unit 10 controls the antenna-switching unit 8, the distributing amplifier 38, the A.G.C. unit 35 and the gates 51 to 54 in synchronism so as to cause each radar pulse signal to be delivered to one antenna element and the corresponding received return signal to be processed by one associated information extraction unit so that the radar signals associated with each antenna element are delivered to one corresponding information extraction unit.

In operation, it is preferred that the system first begin tracking the ranges associated with beams $b_1$ and $b_3$ before it begins processing signals associated with beams $b_2$ and $b_4$. To this end, the master control unit 10 is arranged to deliver radar pulses only to elements ANT.1 and ANT.3 and to distribute the received return pulses only to units 41 and 43 until the desired tracking with respect to the beams is achieved. The achievement of the desired tracking could be indicated by the delivery of the signal from pitch correction unit 61 to master control unit 10. After the desired tracking has begun, the master control unit switches into an operating mode in which the antenna elements are activated in the sequence 1, 3, 2, 4, etc.

Range scanning and tracking unit 48 is operated in a known manner to first open range gate 46 at a succession of instants after the occurrence of the transmitted radar pulse until one gating instant is encountered when a signal appears at the output of the range gate. The occurrence of this signal is detected by unit 48 and causes the unit to switch into a tracking mode in which it causes range gate 46 to open at the corresponding instant during each successive tracking interval and varies the occurrence of this instant slightly in response to subsequent variations occurring from one scanning interval to the next. The Doppler frequency-scanning and tracking unit 47 operates in a comparable manner.

If an attitude-sensing system according to the invention is employed in a spacecraft, the antenna platform 5 could be rigidly connected to the craft and the pitch and roll correction unit connected to operate appropriate attitude control jets provided on the craft so that the system would act to properly orient the entire craft rather than just the antenna platform.

Alternatively, for either aircraft or spacecraft applications, the attitude-sensing system could simply provide indications of the various range values on the basis of which an operator could adjust the orientation of the craft or the antenna platform.

In one exemplary embodiment of the invention, a PRF of 210 pulses/second was employed to provide an unambiguous range interval of 390 nautical miles and each transmitted pulse had a duration of 75 microseconds. At this pulse repetition frequency, and when all four beams are being employed, each beam is pulsed at a rate of 52.5 times per second. The system transmitter was constructed to produce an X-band output at a frequency of 10 GHz and an I.F. output at a frequency of 30 MHz.

Systems according to the invention could be constructed in a straightforward manner to also yield altitude and vertical velocity information on the basis of the range and velocity information provided by all four beams.

It is also a simple matter to produce an indication of the resultant horizontal velocity of the craft on the basis of the forward velocity and lateral velocity component indications.

It will be understood that the above description of the present application is susceptible to various modifications, changes and adaptations.

I claim:

1. A pulse radar attitude sensing system for use in an aircraft or spacecraft, comprising in combination:
   a. antenna means for radiating radar pulse signals toward the ground and receiving their reflections along two pairs of beams, with the beams of each pair being angularly spaced from one another to define a large acute angle and the center axis of one pair of beams defining a longitudinal plane which intersects the plane defined by the center axis of the other pair of beams along a line constituting the reference axis of said system, said beams in said longitudinal plane being directed fore and aft, respectively, of said reference axis, the beams of said other pair being directed transversely of said longitudinal plane;
   b. radar pulse generating means for generating a train of radar pulses and commutation means connected between said generating means and said antenna means for causing said radar pulses to be sequentially routed to said antenna means to sequentially generate said angularly spaced beams;
   c. signal processing means connected to said antenna means for receiving echo pulses resulting from transmission of said radar pulses;
   d. means for determining the transient time between the transmission and reception of said pulses along each of said beams to determine altitude information;
   e. means for determining the Doppler frequency shift in the received echo pulses for determining the velocity components with respect to the ground along orthogonal axes,
   f. antenna attitude control means responsive to the output signals from said signal processing means for adjusting the attitude of said antenna means in accordance with information included in said echo signals;
   g. said commutator means being constructed to connect said antenna to generate in sequential order the forwardly directed beam in said longitudinal plane, then the other beam in said longitudinal plane, then the first one and then the other of said transverse beams;
   h. and gate means responsive to received echo signals for controlling said commutation means so that the received echo signal associated with each antenna element is received and processed before a radar pulse signal is applied to said antenna means to generate the next beam.

2. An arrangement as defined in claim 1 wherein each said beam lies at an angle of 15° with respect to said reference axis of said system.

* * * * *